United States Patent Office 3,050,480
Patented Aug. 21, 1962

3,050,480
PROTECTIVE FILM FORMING COMPOSITIONS
AND RESULTANT FILMS
Walter M. Budde, Minneapolis, Minn., assignor to Archer-
Daniels-Midland Company, Minneapolis, Minn., a cor-
poration of Delaware
No Drawing. Filed Jan. 20, 1958, Ser. No. 709,791
25 Claims. (Cl. 260—22)

This invention relates to dry, thin, tough, hard, adherent, resilient flexible oil film coatings prepared from polyepoxy fatty oil derived compounds of 12 or more carbon atoms in the fatty acid radical, compositions therefor, and their method of production. More particularly the invention relates to an improvement in the preparation of clear and pigmented protective coatings from polyepoxidized vegetable oils and polyepoxidized esters derived therefrom. Essentially, the improvement relates to forming hard films, as distinguished from plastics, by providing film forming selective compositions of long chain epoxidized fatty esters derived from animal, vegetable and marine sources, with selected polycarboxylic acids which provide hard protective clear and pigmented coating films, having outstanding flexibility, without the need for catalysts or added activators therefor.

There is disclosed in U.S. Patent 2,324,483 the curing of resins derived from polyhydroxy phenols namely bisphenol-A and epichlorohydrin (Epon Resins, Shell trademark) with dibasic acid anhydrides. There is further indicated in U.S. Patent 2,768,153, a process for curing epoxy resins to form plastics with acid anhydrides using a special class of activators. The activators are a necessity for these aromatic resin compounds in order to obtain a proper cure, as noted in the aforesaid patent and found by experimentation. The acid anhydrides without the special activator are very slow in reacting, forming films which remain tacky for long periods of time. Epoxidized fatty oil films containing only the anhydride do not acquire the desired hardness.

Epoxidized animal, vegetable and marine oils are glyceryl esters of straight chain aliphatic acids of 12 or more carbon atoms into which a plurality of oxirane groups have been introduced. These epoxidized oils differ from the aforementioned aromatic compounds, Epon Resins, or glycidyl compounds which have been reacted with anhydrides of the known prior art. Essentially, the difference between epoxidized oils and the Epon Resins, of the prior art, lies in the structure and location within the molecule of the respective oxirane group or groups. In the polyepoxidized oils and their derivatives, as defined herein, the oxirane group or groups are located well within the molecule of one or more fatty chains, whereas in the Epon Resins and glycidyl compounds the epoxy group or groups are found in terminal positions.

As is well known, the epoxy oils, per se, do not possess characteristics to form hard dry films. Therefore, there is need for an improvement in this characteristic for producing epoxy oil coating compositions which, when spread, cure quickly to hard, durable films which also have superior chemical resistance, flexibility and adhesion. Further, the preparation of oil derived film formers which can dry under the adverse conditions of high humidity, or in the absence of air and light, to form adherent, hard, flexible films, that are not destroyed by solvents, alkali, and the like has been a problem in the coating and laminating industries. In addition, there is need for protective coatings on transistors and the like which will withstand temperature changes from considerably below −10° C. and up to 150° C. or more. Hard coating films which have a low coefficient of friction, good adhesion, water resistance and which are particularly applicable to ski surfaces are not presently available and are desired.

Accordingly, an object of this improvement is to provide hard protective film forming coating compositions and resultant films derived from epoxidized animal, vegetable and marine oil sources for use as varnishes, sealers and pigmented paints, and methods of producing said compositions and films.

Another object of this improvement is to provide film forming coating compositions and resultant films derived from epoxidized fatty oils which films have excellent flexibility, water and chemical resistance, and are particularly adherent to plastics, such as polyvinyl resins, wood, glass and metals including galvanized and rusty metal surfaces.

A particular object of this improvement is to provide coating compositions and resultant films derived from epoxidized soybean, linseed and the like oils for use in clear or pigmented composition which form tough, flexible and very hard films with good, heat, cold, alkali, water and solvent resistance in the presence or absence of high relative humidity, or in the absence of oxygen.

Another object of this improvement is to provide coating compositions capable of forming hard, clear or pigmented, adherent coatings, said compositions comprising an epoxidized soybean oil, epoxidized linseed oil, epoxidized safflower or the like long chain epoxy oils including their natural and synthetic esters and epoxidized heat bodied or blown drying and semi-drying oils and esters thereof and a polybasic acid, preferably chlorendic acid, mono-chloro phthalic acid, tetrachlorophthalic acid, dibasic acid reactive vinyl copolymers of maleic and fumaric adducts and copolymerized acrylic acid, in a mutual solvent.

An additional object of this improvement in obtaining adherent and protective coatings is to provide film forming fluid compositions and hard flexible films derived from epoxidized soybean, linseed, safflower, and fish oils sources, or esters and copolymer derivatives thereof, with selected crosslinking polybasic acids and adducts of polybasic acids which, when applied as fluid coatings, will set in the presence or absence of air and/or moisture.

An additional further object of this improvement in film formation is to provide thin hard pigmented films having high impact strength and flexibility and formed from epoxidized fatty oils, esters and copolymer derivatives of animal, vegetable and marine oil origin.

A further object of this invention is to provide hard film forming compositions from epoxidized fatty acid modified alkyd resins in which the modifying fatty acids are of animal, vegetable or marine origin.

A further object of this invention is to provide hard film forming compositions derived from epoxidized polyhydric alcohol fatty acid esters in which the fatty acids are derived from animal, vegetable and marine oils.

To the accomplishment of the foregoing and related ends, this improvement then comprises the features hereinafter fully described and particularly pointed out in the claims. The following description sets forth in detail certain illustrative embodiments of the improvement, these being indicative, however, of but a few of the various ways in which the principle of the invention may be employed.

In carrying out the present invention there is utilized an epoxidized oil material which can be an epoxidized vegetable, animal or marine oil, the mono-, di-, tri- or polyhydric alcoholic esters thereof or the epoxidized fatty acids derived from the aforesaid oils and alkyd resins and the like esters utilizing such materials, with such an epoxidized oil source material, or mixtures thereof, there is compounded a strong polybasic acid ingredient or "curing agent," which, by inter-action with the epoxidized compound produces in situ, hard, adherent and exceptionally protective films having many desirable properties.

Epoxidized oil compounds of the character herein set forth may be basically derived from vegetable, animal and marine sources. Exemplary and typical useful base oils and fats are peanut, cottonseed, corn, soybean, safflower, walnut, rapeseed, castor, linseed, perilla, menhaden, sardine, cod, pilchard, shark, whale, sperm, tallow and lard. Included also is tall oil, available as fatty acids. The fatty acids found in the base fats and oils are mixtures of saturated and unsaturated types. They contain from 12 to 26 carbon atoms per acid radical.

For the purposes defined therein, the fatty acids derived from the above base oils and fats, may be separated into fractions or used as mixtures, in the preparation of synthetic fatty esters. Some typical polyhydric alcohol esters which may be used to re-esterify the fatty acids are ethylene glycol, di-ethylene glycol, glycerol, trimethylolethane, sorbitol, and anyone of the several pentaerythritols.

When mono-hydric alcohol esters are desired, they may be synthesized from fatty acids or directly from the base oil or fat by ester interchange procedures. Useful monohydric alcohol esters are of the saturated homologous series, methyl or decyl. However, if the alcohols are unsaturated a longer chain length may be tolerated since their unsaturation may be converted to oxirane groups. This maintains the required oxirane value. Specifically such alcohols may be derived by reduction of the corresponding fatty acids obtained from the base fats and oils previously defined.

Where long chain unsaturated fatty acid esters of monohydric alcohols are used, such esters, when epoxidized will yield satisfactory hard films by the herein described formulations when the oxirane content of such monohydric ester is above about 7%. Such esters, for example, as the polyepoxy methyl ester derivative of linseed fatty acids may be utilized in the herein described formulations with the production of films which are somewhat softer than obtainable with polyester epoxidized materials, but are useful for some applications. Epoxidized fatty acid modified alkyd resins are also useful in forming films. In addition epoxidized polymers of the above oils and esters may be used including the amide, nitrile, and amine derivatives.

However, not all epoxidized animal, vegetable and marine oils and their esters will produce hard, flexible films resistant to solvents. I have found that for hard films the determining factor is the iodine value of the base glycerol ester. This factor must be at least 90 before epoxidation and the crosslinking acidic ingredient (curing agent) is a strong polybasic acid. In some instances when the crosslinking acid is especially reactive, a lower iodine value base oil may be used. The functionality relationship of iodine value and crosslinking acid is measured by some definite physical property of the film formed. In this relationship, the Sward-rocker hardness can be used for the purpose of illustrating the film hardness of this invention, or improvement. The hardness number as so determined, for hard protective films, is 20 or more. In the case of preparing modified films in the form of adhesives, for example, between lamina and other applications, where adhesiveness is required and hardness is not a requisite and may be of a considerably lesser number.

In general, it has been found that epoxidized derivatives of soybean, linseed and safflower oil sources, epoxy polyesters of fatty acids of such oils, epoxy fractions of essentially stearic acid free tallow, and fish oil, form the preferred films according to this invention or improvement.

Especially useful, but non-limiting, mono- and polyepoxidized type compounds may be prepared from the following esters:

Methyl linoleate
Pentaerythritol oleate
Diethylene glycol linoleate
Ethylene glycol linolenate
Di-pentaerythritol linoleate
Pentaerythritol tall oil fatty acid ester
Octanol linseed fatty acid ester
Glycerol menhaden fatty acid ester free of saturated acids
Glycol safflower fatty acid ester
Glycerol tallow fatty acid ester essentially free of saturated acids
Butanol sardine fatty acid ester
Polymerized allyl soya fatty acid ester
Medium oil soya acid modified alkyd resin
Long oil linseed acid modified alkyd resin In the compositions and resultant films of the present improvement there are used acidic ingredients or "curing agents," and as examples of these there may be poly basic acids and derivatives thereof. These may be mentioned, in order of preference chlorendic acid, tetrachlorophthalic acid, mono-chlorophthalic acid, a maleic or fumaric acid adduct of rosin, the maleic or fumaric adduct of an unsaturated oil or fatty acid, hexachlorocyclopentadiene-furan-maleic adduct, and polybasic polymers of acrylic acid or methacrylic acid and copolymers of either with styrene, vinyl toluene, vinyl acetate, and/or acrylonitrile. The pH strength of the acidic ingredient in water at concentration of 1% or more should be no higher than about 4.7 preferably less, and about 4.5. The molecular weight of the acid should be at least 180 with two or more reactive carboxyl groups.

It is believed that the mechanism of the reaction by which the desirable films are produced in accordance with the invention improvement is that a cross-linking reaction occurs between the epoxidized oil base material and the acidic ingredient predominated between oxirane groups, and that this results in molecular interlocking wherein extreme molecular growth and interlinking are predominant characteristics. However, it is to be understood that this suggested theory is only my best understanding of the mechanism and it is therefore not to be understood as a limitation upon the improvement herein provided.

The solubility of the acidic ingredient and epoxidized natural and resynthesized oils in the same common solvents must be essentially complete. As the solvents there may be mentioned the aromatic or aliphatic hydrocarbons, ketones, esters and ethers, e.g., such as acetone, xylene, toluene, diethyl carbitol, methyl ethyl ketone, methyl isobutyl ketone. These are illustrative. Any other mutual solvent non-reactive with either component may be used.

Solutions of the epoxidized fatty acid esters and acidic curing agent form films on glass, resinous, metallic, wood and the like substrates at room or at elevated temperatures.

The following examples are illustrative of the improvement but are not to be considered as a limitation thereon. Unless otherwise stated the amounts specified are by weight.

EXAMPLE I

*Epoxidized Soybean Oil With Chlorendic Acid*

A polyepoxidized soybean oil having 6.3% oxirane oxygen and in an amount of 12.7 parts was mixed with a solution of 10 parts chlorendic acid in Cellosolve acetate solvent in the portion of 14.8 parts. The resulting mixture was a clear colorless solution which remains at a usable viscosity for up to 24 hours at room temperature. It was stable for over 9 months at 0° F. In either case, films made from the solutions dry tack free in about 2 hours at room temperature.

A baking temperature at 300° F. for 2 to 5 minutes affords a hard, clear colorless film which is flexible and not decomposed by submersion in a 10% caustic solution for over a period of two weeks. The film softens slightly when so submerged but upon drying, quickly regains its hard and resilient state without any apparent deterioration.

EXAMPLE II

*Effect of Chlorendic Acid as Compared With Chlorendic Anhydride, in Respect to Epoxidized Soya Bean Oil*

A mixture was prepared containing 50 parts epoxidized soybean oil and 78 parts of 50% chlorendic acid in sufficient methyl iso-butyl ketone to render the mixture easily fluid. This solution provided one acid group per epoxy group.

The composition described above was spread to form a film and was cured by baking as about 300° F. for about 10 minutes. To illustrate the hardness value a comparative formulation was prepared utilizing chlorendic anhydride in lieu of chlorendic acid. The resultant films were baked for 10, 20, 30, 45 and 60 minutes at 300° F. and measuring for Sward hardness, with the following results:

| Time of Bake at 300° F. | Sward-Rocker Hardness | | | | | |
|---|---|---|---|---|---|---|
| | 1½ mil wet film | | 3 mil wet film | | 6 mil wet film | |
| | Acid | Anhydride | Acid | Anhydride | Acid | Anhydride |
| 10 min | 36 | 2 | 28 | | 20 | |
| 20 min | 32 | 2 | 26 | | | |
| 30 min | 32 | 2 | 28 | 2 | 20 | 0 |
| 45 min | 28 | 2 | | 2 | 24 | 0 |
| 60 min | 26 | 2 | 26 | 2 | 18 | 2 |

From the above results it will be noted that the 10 minute bake produced the most satisfactory film hardness and that the comparative anhydride cured film possessed very low hardness, regardless of the bake time.

Accordingly, shorter bakes with the acid at the same temperature were made. The Sward hardness was measured at 2½ min. intervals. After 2½, 5, 7½ and 10 minutes, the test results indicated a Sward hardness of 40, 46, and 36, respectively. Consequently, it is shown that the epoxy oil in combination with the dibasic acid provides excellent hot hardness after only a 2½ minute bake. Further room temperature exposure of the short bake film produced no apparent or determinable hardness change.

The acid cured films of 10 min., 30 min. and 60 min. bake at 300° F. were tested, after cooling, for flexibility with a standard G.E. impact flexibility apparatus and no cracking or rupture was observed. Further, impact tests on panels held for 90 days showed no apparent physical change. The impact test results of dry bake films drawn on tensile steel plates are indicated as follows:

| Thickness, mils | Reading on Impact Test | | | |
|---|---|---|---|---|
| | 10 min. | 30 min. | 60 min. | 90 days |
| 1½ | 60+ | 60+ | 60+ | 60+ |
| 3 | 60+ | 60+ | 60+ | 60+ |
| 6 | 60+ | 60+ | 60+ | 60+ |

The 60+ shows that the films easily withstand a 60% stretch test, the limit of the test apparatus, and that coatings of superior tenacity, toughness, elongation, and flexibility are produced.

In general it may be stated that the herein preferred and most desirable composition of epoxidized soybean oil and chlorendic acid provides an almost instantaneous bake in regard to achieving essentially constant film hardness. This eliminates progressive room temperature curing after the initial bake. The flexibility is outstanding for this degree of hardness.

While the films of the following examples were not tested as completely as the above, excellent hard and adherent coatings may be formed with the illustrated compositions, viz:

EXAMPLE III

*Epoxidized Safflower Oil With Tetrachlorophthalic Acid*

A polyepoxidized safflower oil with an oxirane oxygen content of 7.1% and in the portion of 11.3 parts was added to a solution of tetrachlorophthalic acid monohydrate in the proportion of 8.1 parts in 13.6 parts Cellosolve acetate solvent. The mixture formed a clear colorless solution which cured at room temperature to form a tack-free film in 1½ hours. This composition when baked at 230° F. formed a tough flexible hard film in 15 minutes.

EXAMPLE IV

*Epoxidized Linseed Oil With Monochlorophthalic Acid*

Polyepoxidized linseed oil with an oxirane oxygen content of 8.75% was added in the proportion of 11 parts to a solution of 6.5 parts monochlorophthalic acid in about 12 parts Cellosolve acetate solvent. This mixture was found to cure overnight at room temperature providing hard, tough, flexible films. Baking the freshly coated films at 150° F. decreases the drying time to a period of about 2 to 3 hours.

EXAMPLE V

*Epoxy Soybean Oil With Tetrachlorocyclopentadiene-Maleic Acid Adduct*

A polyepoxy soybean oil in the proportion of 6.35 parts added to a solution of tetrachlorocyclopentadiene-maleic acid adduct in the proportion of 4 parts dissolved in 7.3 parts Cellosolve acetate solvent, produced room temperature curing and baking films. Aging at room temperature overnight provided a hard flexible protective coating which is resistant to water and solvents. Freshly coated films, were hard, flexible, water and solvent resistant when baked at 250° F. for ½ hour.

EXAMPLE VI

*Epoxidized Soybean Non-Phthalic Alkyd Resin and Chlorendic Acid*

An epoxidized alkyd resin containing an oxirane oxygen content of 4% and composed of soybean acids, maleic anhydride, pentaerythritol and 1,4-butanediol, prepared and epoxidized in a conventional manner, in the proportion of 10 parts of the modified epoxidized alkyd resin was added to a solution of 4.7 parts chlorendic acid in about 11 parts Cellosolve acetate solvent. This provided a solution from which tenaciously adherent films were obtained that cured at room temperature or when baked. At room temperature the films cured overnight. By baking the freshly coated films at 300° F. for ½ hour, there was produced a hard, clear and colorless coating. On panel bending tests the films were found to be tough, adherent and flexible.

EXAMPLE VII

*Polyallyl Epoxy Soyate With Chlorendic Acid*

Polyallyl epoxy soyate (prepared by the conventional peroxide-catalyzed polymerization of allyl epoxy soyate) in the proportion of 15.8 parts added to a solution of chlorendic acid (10 parts) in 5 parts toluene and 5 parts methyl iso-butyl ketone produced a composition which, when spread as a film cured at room temperature or when baked. Overnight curing of films of this material at room temperature produced a semi-wrinkle finish which was hard and clear. By baking at 300° F. for ½ hour, the curing time was reduced and a similar finish was obtained.

EXAMPLE VIII

*Epoxidized Glycol Disoyate With Chlorendic Acid*

Epoxidized glycol disoyate containing 6% oxirane oxygen and in the proportion of 12.7 parts added to a solution of chlorendic acid (10 parts) in 14.8 parts Cellosolve acetate solvent produced films which were less tough and were softer than those made from epoxidized soybean oil either in the normal or baked treatment. Films formed from this solution cured overnight. The time of curing was reduced by baking at 250° F. to 300° F. for a period of ½ hour.

EXAMPLE IX

*Epoxidized Fatty Acid Ester of Tall Oil and Tetrachlorophthalic Acid*

Polyepoxidized rosin free pentaerythritol distilled tall oil fatty acid ester containing about 5% oxirane (10 parts) was added to a solution of tetrachlorophthalic acid (7.0 parts) in ethylene glycol diethyl ether (10.5 parts). Films formed from this composition, when baked at 225° F. for 15 minutes, or cured in air at room temperature for 4–6 hours produced hard protective coatings of high quality.

EXAMPLE X

*Epoxidized Marine Oil With Chlorendic Acid*

Polyepoxidized fish oil (a 30° winterized menhaden oil of iodine value 190) (10 parts) was added to a solution of chlorendic acid (6.0 parts) in Cellosolve acetate (10 parts). Films formed of this composition, when baked at 200° F. for 20 minutes or air cured for 2–4 hours afforded excellent protective coatings of excellent hardness.

EXAMPLE XI

*Epoxidized Oil Modified Alkyd Resin With Tetrachlorophthalic Acid*

An epoxidized oleic acid modified with alkyd resin (containing about 3% oxirane), (10 parts), was added to a solution of tetrachlorophthalic acid (5 parts) in ethylene glycol diethyl ether, (7 parts). Films formed from this composition, when baked at 250° F. for 20 minutes were hard, colorless, flexible coatings. When cured at room temperature overnight superior protective coatings were also produced.

EXAMPLE XII

*Epoxysafflower Oil With Copolymer of Vinyl Toluene, Acrylic Acid and Acrylonitrile*

A. *Preparation of copolymer acid.*—A mixture of vinyl toluene (100.3 gm.), acrylonitrile (17.7 gm.) and uninhibited acrylic acid (26.5 gm.) was slowly added over a 2 hour period to a solution of dibenzoyl peroxide (4.0 gm.) in methyl isobutylketone (142.5 gm.) held at 180–190° F. After a total of 6½ hours at this temperature the polymerization was essentially complete and the resultant viscous mixture was cooled and stored at room temperature.

B. *Film formation.*—Epoxy safflower oil containing about 7.1% oxirane (5.0 gm.) was added to the copolymer solution A, above (19.4 gm.), along with additional methyl isobutylketone (5. gm.). Films formed from the resultant composition when baked at 300° F. for ½ hour afforded excellent protective coatings. Air drying the same films for 2–3 hours gave very hard tack free films with good properties.

In general, the ratio of acidic constituent to epoxidized oil constituent depends upon the degree of epoxidation, thus, in a mixture of chlorendic acid and polyepoxidized soybean oil the ratio is 1 mole of acid per mole of oxirane present in the oil. On a weight basis in this illustration the chlorendic acid is present in an amount equalling 79% of the weight of the oil. Operable lower and upper weight levels of acid based on the soybean epoxy oil material, with at least 6% oxirane value, have been established for this improvement as approximately the range of 65% to 105%. Films are generally softer when the acidic constituent is used in amounts less than the lower limit and approach brittleness and are increasingly yellow when the acidic constituent is used in amounts exceeding the upper limit.

For polyepoxidized safflower oil, with about 7% oxirane value, cured with chlorendic acid on a weight basis the range is shifted downward to about 55% to 95% and for epoxidized linseed oil, with an oxirane value above 8, the shift is still further to about 45% to 90% for chlorendic acid.

In general, the higher the oxirane value, the less the amount of acid required to obtain proper cure. The particular alkyl resin material described is of a non-drying type and whereas less oxirane value is present, the initial structure is so complex that less curing agent is required. That is about 50% of the expected amount will be sufficient to form satisfactory films. Further, the proportion of the acidic constituent (curing agent), depends upon the individual effectiveness of the acidic substance (or substances) and its molecular weight. Although different systems will vary somewhat depending upon the characteristics of the acidic constituent and to a lesser extent on the epoxy-oil component, I have found that about 60% to about 100% of acidic constituent based upon the epoxidized constituent will give good results.

The expoxy oil constituent must have a sufficiently high oxirane content to "hold" the required level of curing agent, but excess unreacted oxirane in the cured film apparently does no harm. The amount of crosslinking obtainable is related to the oxirane content of the oil constituent. However, it is not necessary to utilize all the oxirane groups in the crosslinking reaction, thus oils with a high oxirane content, as in Example IV, will form films which are comparable to those of a lesser oxirane content as shown in Example I. Whereas, epoxidized fatty oil modified alkyd resins may have an even lesser percent of oxirane value, as illustrated by Example VI. This modified alkyd resin, as indicated, allows the use of somewhat less than the 65% lower limit of acidic constituent established for expoxidized soybean oil.

When the film forming compositions of this improvement are mixed, the curing reaction tends to proceed, but pot (or shelf) life can be increased by holding the compositions at low temperature until used. In some instances the compositions of acidic and expoxidized oil constituent can, most conveniently be made shortly before for use but unused amounts of composition can be held or stored merely by refrigerating.

In addition, to providing transparent varnish like films these vehicles may be utilized as carriers for dyes and pigments conventionally used in the paint and coating industry. As an example, illustrative of epoxy glyceride oils and other epoxy esters, which includes the modified alkyls, that can be compounded with pigments and ready for mixing with a hard film forming dibasic acid, the following example is typical:

EXAMPLE XIII

*A Paint Composition Prepared in Two Parts*

Part 1:
  320 parts by weight polyepoxidized soybean oil
  300 parts by weight titanium dioxide
Part 2:
  260 parts by weight chlorendic acid
  260 parts by weight solvent Part 1 was compounded on a standard paint mill or mixing apparatus and was used immediately, or when desired may be packaged and stored at ambient temperature for an indefinite period. While part 1 may be stored at ambient temperatures, as indicated, it is to be understood that when used immediately, this is intended to mean by compounding and mixing with the fluid of part 2 which mixture is to be used soon after mixing or that the mixture is to be stored at refrigeration temperature. As examples of other suitable pigments which may be used in making paints and enamels (but not as a limitation) there may be mentioned titanium oxide, calcium sulfate, lithopone, carbonate white lead, zinc oxide, red iron oxide, yellow iron oxide, chrome yellow, chrome green, chrome oxide, iron blue, amine blue and green, lampblack, carbon black, aluminum powders, zinc yellow, and the like. Also oil soluble dyes may be substituted. Other suitable polyepoxy material, as described, may be used in lieu of epoxidized soybean oil in whole or in part. Further, the modified epoxy oil alkyd resins may be substituted in the pigmented formulation. As indicated, the pigment material is first mixed with the epoxy compound and to this mixture is added the acid component and solvent. However, a portion of the solvent may be added to part 1 before addition of the acid, if desired.

Part 2 was prepared by dissolving the chlorendic acid in the solvent, which can be methyl isobutyl ketone, acetone or the like, or any other suitable solvent, non-reactive with either component, in which the epoxy oil is also soluble. This, part 2, may be mixed with part 1 and the mixture applied within a usable period as a coating composition and finished by normal drying or bake hardening or part 2 may be packaged and stored for an indefinite period and mixed with part 1 shortly before application. When sold in the trade, separate containers of the appropriate amounts of part 1 and part 2 are packaged together as a unit for shipment, sale and use.

The liquid coating compositions produced by combining parts 1 and 2, of Example XIII above, cure to hard glossy films at room or at elevated temperatures, as previously described.

The mixture of this example has a pot life of several hours at normal temperature and may be kept for long and indefinite periods when stored under refrigerated conditions. Such refrigerated storage does not impair the subsequent curing of the composition and thin coatings made therefrom may be converted to flexible, hard insoluble condition when cured by normal drying, baking or heating. Because of the relatively long pot life of these compositions, and other setting-up factors they cannot be considered the equivalent of casting or moulding plastics, which are required to set to a hard state, in bulk forms, in a much shorter interval.

An especially useful attribute of the compositions of this invention is that the clear or pigmented films may be used to form hard tenacious protective coatings on rusty metal and galvanized surfaces to which they adhere with peculiar tenacity. For example, a composition prepared as specified in Example XIII and containing aluminum oxide as the pigment provides a paint composition especially useful for painting rusty iron surfaces. The resultant coatings on rusty iron, when dry, provided a protective coating which could be removed only by sanding and abrading down to the metal, even without removal of the rust before painting. Abrading the coated rusty iron against a concrete wall did not cause the closely adherent film to observedly break or peel from the surface. The penetration adherence of the coating to rusty surfaces are outstanding attributes. In addition, wet rusty iron surfaces may be coated with the pigmented compositions prepared in the manner as described. The resultant films cure to a hard adherent condition when immediately immersed in water. Thus, there are provided by this improvement film forming compositions which can be applied under water by inverting the container and brushing in the usual manner. While this is an extreme example of a mode of application, the versatility of the improvement is illustrated. Further, the clear or pigmented coating compositions, as herein described, are found to adhere to galvanized metal and serve extremely well as exterior coatings, or as the primer base coating for vinyl and other varnish and paint compositions. Because of exceptional adhesion, the galvanized metal may be primed in the mill and later worked into shapes. Further, in addition to being resistant to corrosion, the hard coating films produced in accordance with this improvement have been found not to be brittle at extremely low temperature, they do not stick or readily freeze to ice and provide an excellent surfacing for skis and sled runners. In addition, the hard film formed by the herein described coating composition, provides a glass-like smooth surfacing which is ideal for bars and furniture as they do not spot with water or alcohols and are not affected at temperatures of 100° C. to 150° C. The film coatings produced by using the compositions described are suitable for application to electrical devices, where insulation life and resistance to absorption of moisture, including resistance to deterioration upon exposure to the elements and heat, are particularly required. Further, in view of the tenacious adherence of the polyepoxy coating compositions to vinyl resin, the compositions provide excellent laminating adhesives for vinyl and other plastics where toughness and flexibility are desired. In some instances, the polyepoxy compositions may be modified to form adherent coatings of a less desirable hardness which characteristic is of benefit in some instances of laminating and impregnating.

It is apparent that many modifications and variations of this invention, or improvement, as hereinbefore set forth may be made without departing from the spirit and scope thereof. The specific embodiments described are given by way of example only and invention, or improvement, is limited only by the terms of the appended claims.

I claim:

1. A coating vehicle for forming thin flexible hard dry films with an epoxidized fatty chain containing material selected from the group consisting of epoxidized long chain fatty acids and the esters thereof having an iodine value of at least 90 before epoxidation and after epoxidation containing not less than 4% oxirane groups located within the molecules of the said fatty chain material, said vehicle consisting of a mutual solvent containing a mixture of a said epoxidized fatty chain material and a polycarboxylic acid having a molecular weight of at least 180, at least two reactive carboxylic acid groups and a pH value of not more than about 4.7, and said acid and the said epoxidized fatty chain containing material constituting the reactants for forming said film.

2. The coating composition of claim 1, wherein the said fatty material is an unsaturated vegetable oil having an iodine value of at least 90 before epoxidation and after epoxidation has internal oxirane groups in the amount of 4% to about 10%.

3. The coating composition of claim 1, wherein the said fatty material is soya oil and the fatty chains therein have an internal oxirane content of at least about 6%.

4. The coating composition of claim 1, wherein the said fatty material is linseed oil and the fatty chains therein have an internal oxirane value of at least 8%.

5. The product of claim 1, wherein the said fatty material is safflower oil and the fatty chains therein have an internal oxirane value of at least 6%.

6. The product of claim 1, wherein the said fatty material is marine oil and the fatty chains therein having an internal oxirane value of about 4% to about 10%.

7. A coating vehicle consisting of a mixture of an epoxidized ester of long chain fatty acid containing a fatty chain portion of 12 to 26 carbon atoms having an iodine value of at least 90 before epoxidation and after epoxidation having at least about 4% internal oxirane value, from about 45% to about 100% polycarboxylic acid based on the weight of the said ester and having a molecular weight of at least 180, at least two reactive carboxylic acid groups and a pH value of not more than about 4.7 a mutual solvent for the said ester and said polycarboxylic acid, said carboxylic acid being present in an amount of at least about 1 equivalent of said acid per 1 equivalent of the oxirane value of the said epoxidized ester.

8. The coating composition of claim 7, wherein the said fatty chain portion is derived from soybean oil and has an internal oxirane value of at least 6%.

9. A dry, tough, thin flexible polyester coating material having a Sward-rocker hardness test of at least 20 and consisting of the reaction product of a polyepoxy ester of a long chain fatty acid containing a fatty chain having from 12 to 26 carbon atoms in the fatty chain with an iodine value of at least 90 before epoxidation and after epoxidation containing from about 4% to 10% internal oxirane value and a mutually solvent soluble polycarboxylic acid having a molecular weight of at least 180, at least two reactive carboxylic acid groups and a pH value of not more than about 4.7, said acid being present in an amount of at least about 1 equivalent of acid per 1 equivalent of oxirane value of the said ester.

10. The coating material of claim 9, wherein the said polyepoxy fatty ester is an epoxidized vegetable oil and the pH value of the said carboxylic acid is not more than about 4.5.

11. The coating material of claim 9, wherein the said polyepoxy fatty ester is an epoxidized animal oil and the pH value of the said carboxylic acid is not more than about 4.5.

12. The coating material of claim 9, wherein the said polyepoxy fatty ester is an epoxidized marine oil and the pH value of the said carboxylic acid is not more than about 4.5.

13. A dry, tough, thin flexible oil film coating vehicle consisting of the reaction product of a polyepoxy ester of polyhydric alcohol and unsaturated long chain fatty acid having an iodine value of at least 90 before epoxidation and after epoxidation containing from about 5% to about 10% internal oxirane for at least every 14 carbon atoms in the fatty chain of the acid radical, and a polycarboxylic acid having a molecular weight of at least 180, at least 2 reactive carboxylic acid groups and a pH value of not more than about 4.7, said acid being present in an amount of at least about 1 equivalent of acid per 1 equivalent of oxirane value of the said ester.

14. The film coating product of claim 13, wherein the epoxy compound is an epoxidized ester of a pentaerythritol and unsaturated fatty acid.

15. The film coating product of claim 13, wherein the epoxy compound is a fatty oil modified alkyd resin.

16. A pigmented flexible oil film coating material having a Sward-rocker test hardness of at least about 20, consisting of the reaction product of a polyepoxy ester of a fatty acid containing a long chain fatty group having unsaturated carbon chains of at least 14 carbon atoms and an iodine value of at least 90 before epoxidation and at least 6% internal oxirane value after epoxidation and a polycarboxylic acid cross-linking agent having a molecular weight of at least 180, at least two reactive carboxylic acid groups and a pH value of not more than about 4.7, and a coloring pigment, said acid being present in an amount of at least about 1 equivalent of acid per 1 equivalent of oxirane value of the said ester.

17. The product of claim 16, wherein the said polyepoxy fatty ester is an epoxidized soybean oil and the polycarboxylic acid material is selected from the group consisting of chlorendic acid, tetrachlorophthalic acid, mono-chlorophthalic acid, maleic and fumaric adducts of rosin, maleic and fumaric adducts of unsaturated fatty oils and fatty acids, maleic and maleic-furan adducts of a halogenated pentadiene, and maleic and maleic-furan adducts of a halogenated cyclopentadiene, polycarboxylic acid polymers and copolymers of acrylic acid and methacrylic acid, and copolymers of said acrylic acid and styrene, vinyl toluene, vinyl acetate, and acrylonitrile.

18. The product of claim 16, wherein the said polyepoxy fatty ester is an ester of tall oil acids and the said carboxylic acid is selected from the group consisting of chlorendic acid, tetrachlorophthalic acid, monochlorophthalic acid, maleic and fumaric adducts of rosin, maleic and fumaric adducts of unsaturated fatty oils and fatty acids, maleic and maleic-furan adducts of a halogenated pentadiene, and maleic and maleic-furan adducts of a halogenated cyclopentadiene, polycarboxylic acid polymers and copolymers of acrylic acid and methacrylic acid, and copolymers of acrylic acid and styrene, vinyl toluene, vinyl acetate, and acrylonitrile.

19. The product of claim 16, wherein the polyepoxy fatty ester compound is linseed oil and the said carboxylic acid is selected from the group consisting of chlorendic acid, tetrachlorophthalic acid, monochlorophthalic acid, maleic and fumaric adducts of rosin, maleic and fumaric adducts of unsaturated fatty oils and fatty acids, maleic and maleic-furan adducts of a halogenated pentadiene, maleic and maleic-furan adducts of a halogenated cyclopentadiene, polycarboxylic acid polymers and copolymers of acrylic acid and methacrylic acid and copolymers of acrylic acid, and styrene, vinyl toluene, vinyl acetate, and acrylonitrile.

20. The product of claim 16, wherein the polyepoxy fatty ester compound is an epoxidized polyhydric alcohol ester of an unsaturated straight chain fatty acid of 14 to 26 carbon atoms in the fatty radical.

21. A dry, tough, thin flexible film obtained as the reaction product of a polyepoxy fatty oil containing a long chain fatty radical of 14 to 26 carbon atoms having from about 6% to about 10% internal oxirane value and derived from a polyunsaturated long chain fatty oil having an iodine value of at least 90 prior to epoxidation, and a reactive polycarboxylic acid cross-linking agent having at least 2 carboxyl groups, a molecular weight of at least 180 and a pH value of not more than about 4.7, said acid being present in an amount of at least about 1 equivalent of acid material per 1 equivalent of oxirane value of said polyepoxy fatty oil.

22. The product of claim 21, wherein the epoxidized oil material is an epoxidized fatty acid modified alkyd resin.

23. A flexible, alkali and solvent resistant coating material consisting of the reaction product of an alkyd resin and an epoxidized fatty acid material selected from the group consisting of epoxidized long chain fatty acids and the epoxidized esters thereof having an iodine value of at least about 90 before epoxidation and after epoxidation containing about 3% to about 10% internal oxirane, said epoxidized oil material being cured in situ with a polycarboxylic acid having at least 2 reactive carboxyl groups, a molecular weight of at least 180 and a pH value of not more than about 4.7, said acid material being present in an amount of at least about 1 equivalent of acid material per 1 equivalent of the said epoxidized glyceride oil material.

24. A flexible film coating material consisting of the reaction product of an acrylic acid copolymer and an epoxidized fatty chain containing material selected from the group consisting of epoxidized long chain fatty acids and the esters thereof having an iodine value of at least about 90 before epoxidation and after epoxidation containing from 4% to about 10% internal oxirane, said epoxidized oil material being cured in-situ with a polycarboxylic acid having at least 2 reactive carboxyl groups, a molecular weight of at least 180 and a pH value of not more than about 4.7, said polycarboxylic acid being present in an amount of at least about 1 equivalent of acid per 1 equivalent of the oxirane value of the said epoxidized fatty chain containing material.

25. A hard resinous material comprising the reaction product of an alkyd containing epoxidized fatty chains selected from the group consisting of epoxidized long chain fatty acids and the esters having an iodine value of at least about 90 before epoxidation and after epoxidation containing about 3% to about 10% internal oxirane, said epoxidized oil modified alkyd being cured in situ with a polycarboxylic acid having at least 2 reactive carboxyl groups, a molecular weight of at least 180 and a pH value of not more than about 4.7, and present in an amount of at least about 1 equivalent of acid per 1 equivalent of the said oxirane value.

References Cited in the file of this patent

UNITED STATES PATENTS

| | | | |
|---|---|---|---|
| 2,720,500 | Cody | Oct. 11, | 1955 |
| 2,732,367 | Shokal | Jan. 24, | 1956 |
| 2,754,307 | Hempel | July 10, | 1956 |
| 2,801,253 | Greenspan | July 30, | 1957 |
| 2,829,984 | Yaeger | Apr. 8, | 1958 |
| 2,907,733 | Greenlee | Oct. 6, | 1959 |

FOREIGN PATENTS

| | | | |
|---|---|---|---|
| 737,697 | Great Britain | Sept. 28, | 1955 |